United States Patent [19]

Kazama et al.

[11] 4,408,034
[45] Oct. 4, 1983

[54] METHOD FOR CURING URETHANE RESINS

[75] Inventors: Seiji Kazama, Kawanishi; Michio Tanaka, Takatsuki, both of Japan

[73] Assignee: Takeda Chemical Industries, Ltd., Osaka, Japan

[21] Appl. No.: 347,272

[22] Filed: Feb. 9, 1982

[30] Foreign Application Priority Data

Feb. 9, 1981 [JP] Japan .................................. 56-18320
Dec. 16, 1981 [JP] Japan ................................ 56-204037

[51] Int. Cl.³ .................... C08G 18/08; C08G 18/18; C08G 18/81
[52] U.S. Cl. ........................................ 528/54; 528/53; 528/45
[58] Field of Search ............................ 528/54, 53, 45

[56] References Cited

U.S. PATENT DOCUMENTS 3,874,898 4/1975 McInnes et al. ...................... 117/62

Primary Examiner—John Kight, III
Assistant Examiner—M. L. Moore
Attorney, Agent, or Firm—Wenderoth, Lind & Ponack

[57] ABSTRACT

A method for curing an isocyanate group-containing compound, which comprises treating with a tertiary amine in a vapor-phase state an isocyanate compound having in one molecule not less than two isocyanate groups linked to an aromatic nucleus through a methylene group or an isocyanate-terminated urethane resin obtained by the reaction thereof with an active-hydrogen containing compound.

The isocyanate compounds or isocyanate-terminated urethane resins are allowed to cure and dry for a shortened period of time ranging from about 1 to 10 minutes.

The method of this invention can be advantageously employed in field, such as continuous painting and printing.

7 Claims, No Drawings

METHOD FOR CURING URETHANE RESINS

This invention relates to high-speed curing of isocyanate group-containing compounds.

Urethane resins, because of their excellent toughness, chemical resistance, adherence and gloss, find wide application in paints, printing inks, adhesives, etc.

The urethane resins to be utilized in these fields are normally available in one-can type and two-can type. The former consists of a compound with 500 to 10,000 molecular weight having not less than two isocyanate groups in one molecule, and cures through polymerization and crosslinking by the reaction of its isocyanate groups with the moisture in the air, etc. after being applied on substrates. The latter comprises a polyol containing not less than two hydroxyl groups in one molecule as a resin and a polyisocyanate having not less than two isocyanate groups in one molecule as a curing agent, both of which are mixed at determined ratios to be applied on substrates, and cures through polymerization and crosslinking by the reaction of the isocyanate groups with the hydroxyl groups.

The reaction between an isocyanate group and water or a hydroxyl group is regarded as relatively fast. In the case of the continuous painting step, printing step, etc. which involve continuous application and curing and drying for a short period of time, nevertheless, the urethane resins utilizing such reaction exhibit a practically unsatisfactory rate of curing, and are in practice allowed to cure at higher speeds by addition of catalysts and further baking at temperatures exceeding 100° C. or 200° C. as the case may be. Addition of a catalyst to a resin composition deteriorates its storage stability and, in the case of a two-can type resin, furthermore shortens the pot life after mixing the two components, and is also deleterious to the operation. Drying through baking at increased temperatures requires huge quantities of energy and brings about thermal deterioration of substrates, and cannot be applied to plastic substrates, in particular.

Aliphatic isocyanates are used for the non-yellowing urethane resins which find widening application especially in the area of paints, and these show reactivity inferior to aromatic isocyanates and are more difficult to cure at high speeds.

As the high-speed curing method at ambient temperature, there has been proposed a method which comprises coating a polyisocyanate prepolymer on a substrate and treating the prepolymer with an amine in a vapor-phase state (U.S. Pat. No. 3,874,898). According to this method, use is also made of amines having active hydrogen such as ammonia, monoethylamine and ethylenediamine, which react with isocyanate groups and act as a chain extender or crosslinking agent.

Since amino groups give a much higher rate of reaction with isocyanate groups as compared with water or hydroxyl groups, the method enables high-speed curing to be accomplished even with urethane resins based on aliphatic isocyanates. Nevertheless, the method involves formation of cured coating films through the crosslinking reaction due to the above amines being captured by isocyanate groups on the surface layers of coating films, thus inhibiting the diffusion of amine vapors into the inside of the coating films, and can be applied only to painting to a reduced thickness of coating films or printing. In addition, the method encounters difficulties in reacting the stoichiometric amount of amines with isocyanate groups.

On the other hand, triethylamine has been described as an amine in the above-mentioned U.S. patent. Triethylamine, because of its having no active hydrogen, acts as a reaction catalyst but not as a crosslinking agent. Therefore, triethylamine is not required to be used in stoichiometric amount relative to isocyanate groups contained in urethane resins, and it is not captured by isocyanate groups on the surface layers of paints, and diffuses smoothly into their interior.

The present inventors carried out extensive investigation on methods for curing various isocyanate compounds and urethane resins obtained therefrom with the use of said triethylamine, and as a result, recognized that triethylamine, when aromatic isocyanates are employed as an isocyanate compound, accelerates the reaction between isocyanate groups and water or hydroxyl groups and allows the curing of resins to proceed uniformly and quickly. However, it was found that in the case of the use of aliphatic isocyanates such as 1,6-hexamethylene diisocyanate and 3-isocyanatomethyl-3,5,5-trimethylcyclohexyl isocyanate, triethylamine displays no catalytic action on the reaction between isocyanate groups and water or hydroxyl groups. The present inventors, after further investigation, found that triethylamine possesses catalysis specifically for the isocyanate compounds having in one molecule not less than two isocyanate groups linked to an aromatic nucleus through a methylene group, among aliphatic isocyanates, as well as urethane resins obtained therefrom. In addition, it was found that tertiary amines, particularly alkanolamines having a tertiary nitrogen atom, besides triethylamine, have excellent catalysis as well.

The above findings were followed by further research which has resulted in this invention. Thus, this invention relates to a method for curing an isocyanate group-containing compound, which comprises treating, with a tertiary amine in a vapor-phase state, an isocyanate compound having in one molecule not less than two isocyanate groups linked to an aromatic nucleus through a methylene group, or an isocyanate-terminated urethane resin obtained by the reaction thereof with an active-hydrogen containing compound.

As the isocyanate compounds which are useful in this invention, there may be mentioned the compounds having isocyanate groups linked to an aromatic nucleus through a methylene group, such as diisocyanates exemplified by 1,2-bis(isocyanatomethyl)benzene, 1,3-bis(isocyanatomethyl)benzene, 1,4-bis(isocyanatomethyl)benzene, 1,3-bis(isocyanatomethyl)-5-methylbenzene, 1,3-bis(isocyanatomethyl)-5-ethylbenzene, 1,4-bis(isocyanatomethyl)-2-methylbenzene and 1,5-bis(isocyanatomethyl)naphthalene, and triisocyanates exemplified by 1,3,5-tris(isocyanatomethyl)benzene and dimers, trimers and biurets of the above diisocyanates or triisocyanates.

In this invention, these isocyanate compounds themselves are the object of curing, and also, such isocyanate compounds may be reacted for example with active-hydrogen containing compounds to convert them into isocyanate-terminated urethane resins.

As the urethane resins, by way of example, there may be mentioned the compositions which are referred to as the so-called moisture-curing type urethane resins and are used as a one-can type. The compositions are prepolymers having free isocyanate groups which are obtained by the reaction of an excess amount of isocyanate compounds with active-hydrogen containing compounds. As the active-hydrogen containing compounds, there may be mentioned polyether polyols, polyester polyols, polyether ester polyols and others which have 300 to 10,000 molecular weight and 2 to 4 functional groups.

Examples of the polyether polyols include those obtained by the ring-opening addition polymerization of, for example, ethylene oxide, propylene oxide or their mixture to, for example, ethylene glycol, propylene glycol, glycerol, pentaerythritol, etc. used as an initiator, or polytetramethylene ether glycol obtained for example by the ring-opening polymerization of tetrahydrofuran, and others.

The polyester polyols are obtained by the condensation reaction of dibasic or tribasic acids, such as maleic acid, fumaric acid, succinic acid, adipic acid, sebacic acid, azelaic acid, phthalic acid, isophthalic acid, terephthalic acid and trimellitic acid, with dihydric to tetrahydric alcohols. Examples of the dihydric to tetrahydric alcohols include ethylene glycol, diethylene glycol, triethylene glycol, propylene glycol, dipropylene glycol, 1,3-butylene glycol, 1,4-butylene glycol, 1,5-pentanediol, 1,6-hexanediol, neopentyl glycol, decamethylene glycol, 2,4,4-trimethyl-1,3-pentanediol, cyclohexanediol, cyclohexanedimethanol, xylylene glycol, hydroquinonebis(hydroxyethyl ether), hydrogenated bisphenol A, trimethylolpropane, glycerol, 1,2,6-hexanetriol, pentaerythritol, castor oil, etc. Higher fatty acids such as coconut oil fatty acids, linseed oil fatty acids, soybean oil fatty acids, cottonseed oil fatty acids, tung oil fatty acids and castor oil fatty acids may be incorporated into the acid component to make oil-modified polyester polyols.

Polyether ester diols, polybutadienediol, polyisoprenediol, castor oil, etc. can also be used as polyols.

The isocyanate-terminated urethane resins may be so-called two-can type urethane resins.

The two-can type urethane resins consist of two components: a resin comprising a polyol having not less than two hydroxyl groups in one molecule and a curing agent comprising a polyisocyanate having not less than two isocyanate groups in one molecule.

The polyols which are used as the resin include polyether polyols, polyester polyols and others having 300 to 20,000 molecular weight and 2 to 10 functional groups. Such polyethers and polyesters can be obtained by the same procedures as employed in the case of the above one-can type urethane resins. Acrylic polyols are also polyols suited for this invention, and are obtained by the copolymerization of esters of acrylic acid, such as ethyl acrylate, butyl acrylate and octyl acrylate, esters of methacrylic acid, such as methyl methacrylate, butyl methacrylate and hexyl methacrylate, and vinyl monomers, such as styrene, with hydroxyl-containing acrylic monomers, such as β-hydroxyethyl acrylate and β-hydroxyethyl methacrylate. Such acrylic polyols include polyols having 1,000 to 30,000 molecular weight and 5 to 50 functional groups.

The polyisocyanates which constitute the curing agent component are obtained by the reaction of the above isocyanate compounds with polyfunctional alcohols, such as diethylene glycol and trimethylolpropane, or water. The curing agent component for moisture-curing or two-can type urethane resins is normally reacted by the known procedures. The reaction temperature is about 10° to 120° C. and the reaction time is about 1 to 10 hours. The reaction is conducted without solvent or in the presence of organic solvents having no active hydrogen.

In cases in which the urethane resins or isocyanate compounds obtained by the above procedure are utilized as paint or printing ink, normally, they are desirably in the state of solutions in organic solvents, although they can be used in the solvent-free state. Examples of the organic solvents having no active hydrogen include esters, such as ethyl acetate, butyl acetate and cellosolve acetate, and ketones, such as acetone, methyl ethyl ketone and methyl isobutyl ketone, which are particularly preferred in that they not only dissolve urethane resins readily but also produce the effect of promoting permeation and diffusion of tertiary amines.

When solutions of these urethane resins or isocyanate compounds are used as paint or printing ink, they are incorporated with, for example, pigments, levelling agents, antifoaming agents, stabilizers against weathering, etc.

In this invention, the isocyanate compounds or urethane resins are applied on substrates by such means as coating and printing at an application rate of about 1 g/m$^1$ to 200 g/m$^2$ on a dry weight basis, followed by treatment with tertiary amines in the vapor-phase state. This procedure is practically conducted by means such as allowing substrates, on which the isocyanate compounds or urethane resins are applied, to stand in a room filled with vapors of tertiary amines.

Materials of the substrates may be any of, for example, wood, iron, steel, aluminium, slate, flexible board, perlite board, asbestos slate, plastics or composite materials thereof. Furthermore, their shapes or forms may be any of sheet, board, molded article, etc.

Examples of the tertiary amines include aliphatic tertiary amines such as trimethylamine, triethylamine, tripropylamine, tributylamine and triamylamine; aromatic tertiary amines such as dimethylaniline, diethylaniline and tribenzylamine; N-methylmorpholine, N-ethylmorpholine, etc.; alkanolamines having a tertiary nitrogen atom such as triethanolamine, methyldiethanolamine, dimethylethanolamine, diethylethanolamine, dibutylethanolamine, diisopropylethanolamine, di(2-ethylhexyl)ethanolamine, ethyldiethanolamine, triisopropanolamine, dibutylisopropanolamine and dimethylisopropanolamine, and the like. Particularly, dimethylethanolamine is suitable.

The concentration of tertiary amines in the vapor-phase may be in the range of about 10 to 100,000 ppm, more preferably in the range of about 100 to 20,000 ppm. The temperature may be room temperature but is adjusted to a suitable temperature within the range of about 0° to 100° C., preferably about 10° to 60° C., to allow curing and drying to be accomplished. The treatment time varies depending upon the composition of the resins, thickness of coating films, and type and concentration of tertiary amines, and is normally in the range of about 1 to 10 minutes.

According to this invention, even isocyanate group-containing compounds based on aliphatic isocyanates are allowed to cure and dry for a shortened period of time ranging from about 1 to 10 minutes. Therefore, the method of this invention can be advantageously employed in fields such as continuous painting and printing etc., where continuous coating, along with curing and drying for a short period of time, is accomplished. In addition, it can be applied for outdoor uses where weatherability is particularly required, because cured and dried coating films are non-yellowing.

Below described are examples to illustrate more specifically this invention, in which parts indicate parts by weight, and % designates % by weight.

EXAMPLE 1

A mixture of 592 parts of phthalic anhydride, 560 parts of coconut oil fatty acid and 805 parts of trimethylolpropane was heated up to 220° C. While nitrogen gas is blown into the reaction system so that the water produced in the reaction system may be removed along with the nitrogen gas, the reaction is allowed to proceed to give a polyester polyol having an acid value of 5 and a hydroxyl value of 187. To thus-obtained polyester polyol was added butyl acetate so as to yield a 75% solution of the polyester polyol. On the other hand, 400 parts of 1,4-bis(isocyanatomethyl)benzene was heated with 45 parts of trimethylolpropane at 70°–75° C. for 4 hours to allow the reaction to take place.

Then the unreacted 1,4-bis(isocyanatomethyl)benzene was removed by extraction with a mixed solvent of n-hexane and ethyl acetate (weight ratio=9:1), and the remainder was dissolved in ethyl acetate to give a polyisocyanate solution (NCO content: 11.5%, solid content: 75%).

400 parts of the above polyester polyol and 385 parts of titanium oxide were mixed, which was further mixed with 370 parts of the above polyisocyanate solution. The resultant composition was applied onto an aluminium plate so that the thickness of the coating film may be 50$\mu$ and, upon standing for 5 minutes in a room at 25° C. containing 100 ppm of dimethylethanolamine, a completely dried, glossy white coating film was formed.

A 400-hour accelerated weathering test with a sunshine type weather-O-meter (W-O-M) indicated that nothing abnormal was observed.

REFERENCE EXAMPLE 1

The compositions (NCO/OH=1.0; PWC=40%) each prepared from the same polyester polyol as in Example 1 and, instead of the polyisocyanate solution employed in Example 1, tolylene diisocyanate (2,4-isomer/2,6-isomer=80/20)-trimethylolpropane adduct (NCO content: 12.9%, solid content: 75%), diphenylmethane diisocyanate-trimethylolpropane adduct (NCO content: 14.2%, solid content: 75%), 1,6-hexamethylene diisocyanate-trimethylolpropane adduct (NCO content: 12.6%, solid content: 75%) and 3-isocyanatomethyl-3,5,5-trimethylcyclohexylisocyanate-trimethylolpropane adduct (NCO content: 11.0%, solid content: 75%), respectively, are each applied onto an aluminium plate so that the thickness of the coating film may be 50$\mu$ and, upon standing for 5 minutes in a room at 25° C. containing 100 ppm of dimethylethanolamine, the state of drying was tested. The tack free films were subjected to weathering test. The results are shown in the Table below.

TABLE

| Poly-isocyanate[a] | State of Drying | Weatherability, 400 hours in W-O-M | |
|---|---|---|---|
| | | Gloss retention ratio | Δb |
| 1,4XDI based | o | 98% | 2 |
| TDI based | o | 17 | 8 |
| MDI based | o | 15 | 10 |
| HDI based | x (tacky) | — | — |
| IPDI based | x (tacky) | — | — |

Notes:
o . . . Good;
x . . . Poor
[a] 1,4XDI based; 1,4-Bis(isocyanatomethyl)benzene-trimethylolpropane adduct
TDI based; Tolyelene diisocyanate-trimethylolpropane adduct
MDI based; Diphenylmethane diisocyanate-trimethylol-propane adduct
HDI based; 1,6-Hexamethylene diisocyanate-trimethylolpropane adduct
IPDI based; 3-Isocyanatomethyl-3,5,5-trimethyl-cyclohexylisocyanate-trimethylolpropane adduct

EXAMPLE 2

1128 parts of 1,3-bis(isocyanatomethyl)benzene was reacted with 268 parts of trimethylolpropane and 1000 parts of polybutylene adipate (1000 molecular weight) in 3594 parts of ethyl acetate to give a polyisocyanate solution (solid content: 40%, NCO content: 2.8%).

The solution was painted on an iron-phosphate treatment iron plate to 50$\mu$ thickness of the coating film, and, upon standing for 5 minutes in a room at 20° C. containing 200 ppm of dimethylethanolamine, yielded a completely dried coating film. The properties of the coating film are as follows:

| | |
|---|---|
| Pencil hardness | 2H |
| Cross-hatch adhesion | 100/100 |
| Erichsen cupping test | 8mm |
| Impact test (Du'Pont type) | ½" × 500g × 50cm |
| Mandrel bending test | 2mm |
| Solvent resistance | |
| Ethyl acetate | Satisfactory |
| Xylene | Satisfactory |
| Ethanol | Satisfactory |
| Elongation | 121% |
| Tensile strength | 485kg/cm$^2$ |

When an amine-vapor room was not employed, it took 3 hours 30 minutes to dry.

EXAMPLE 3

400 parts of polyester polyol (the same as in Example 1) and 91 parts of titanium oxide (the same as in Example 1) were mixed, and the mixture was further mixed with 81 parts of 1,3,5-tris)isocyanatomethyl)benzene. The resulting composition was applied onto an aluminium plate to 50$\mu$ thickness of the coating film, and upon standing for 5 minutes in a room at 25° C. containing 100 ppm of dimethylethanolamine, yielded a completely dried, glossly white coating film.

The 400-hours accelerated weathering test with a sunshine type weather-o-meter indicated that nothing abnormal was observed.

EXAMPLE 4

400 parts of 1,3-bis(isocyanatomethyl)benzene was subjected to reaction with 27 parts of trimethylolpropane by heating at 70° to 75° C. for 4 hours. Then unreacted 1,3-bis(isocyantomethyl)benzene was removed by extraction with the same solvent as in Example 1, and the remainder was dissolved in ethyl acetate to give a polyisocyanate solution (NCO content: 11.5%, solid content: 75%).

According to a conventional method, 46.8 parts of styrene, 30 parts of n-butyl acrylate and 23.2 parts of 2-hydroxyethyl methacrylate were copolymerized in a mixed solution of xylene and butyl acetate, and there was obtained an acrylic polyol solution (hydroxyl value: 50, solid content: 50%).

1122 parts of the above acrylic polyol solution and 556 parts of titanium oxide were mixed, and 365 parts of the above polyisocyanate solution was mixed with the mixture. The resulting composition was applied onto an aluminium plate so that the thickness of the coating film may be 50μ and, upon standing for 3 minutes in a room at 25° C. containing 10,000 ppm of dimethylethanolamine, a completely dried, glossy white coating film was formed.

The properties of the coating film are as follows:

| Pencil hardness | 2H |
| --- | --- |
| Cross-hatch adhesion | 100/100 |
| Erichsen cupping test | 8mm |
| Impact test | ½" × 500g × 50cm |
| Mandrel bending test | 2mm |
| Solvent resistance | |
| Ethyl acetate | Satisfactory |
| Xylene | Satisfactory |
| Ethanol | Satisfactory |
| Weatherability (400 hours in W-O-M) | Nothing abnormal was observed |

When an amine-vapor room was not employed, it took 4 hours to dry.

EXAMPLE 5

1,000 parts of polypropylene glycol (1,000 molecular weight), 268 parts of trimethylol propane and 406 parts of ethyl acetate were mixed, and the mixture was further mixed with 2,920 parts of the polyisocyanate solution obtained in Example 4. The resulting composition was applied onto an aluminium plate so that the thickness of the coating film may be 50μ and, upon standing for 7 minutes in a room at 20° C. containing 20,000 ppm of dimethylethanolamine, a completely dried coating film was formed.

When an amine-vapor room was not employed, it took more than 10 hours to dry.

What is claimed is:

1. A method for curing an isocyanate group-containing compound, which comprises treating, with a tertiary amine in a vapor-phase state, an isocyanate compound having in one molecule not less than two isocyanate groups linked to an aromatic nucleus through a methylene group, or an isocyanate-terminated urethane resin obtained by the reaction thereof with an active-hydrogen containing compound.

2. A method as claimed in claim 1, wherein the isocyanate-terminated urethane resin is a moisture-curing type urethane resin.

3. A method as claimed in claim 1, wherein the isocyanate-terminated urethane resin is a two-can type urethane resin.

4. A method as claimed in claim 3, wherein the two-can type urethane resin is one which comprises a polyester polyol or acrylic polyol and a polyisocyanate obtained by the reaction of 1,3-bis(isocyanatomethyl)benzene or 1,4-bis(isocyanatomethyl)benzene with trimethylolpropane.

5. A method as claimed in claim 1, wherein the concentration of the tertiary amine in the vapor-phase is in the range of about 10 to 100,000 ppm.

6. A method as claimed in claim 1, wherein the tertiary amine is an alkanolamine having a tertiary nitrogen atom.

7. A method as claimed in claim 6, wherein the alkanolamine having a tertiary nitrogen atom is dimethylethanolamine.

* * * * *